July 22, 1952 F. KAHN 2,603,972
RELATIVE HUMIDITY METER
Filed Nov. 9, 1946 2 SHEETS—SHEET 1

Inventor
Frank Kahn

July 22, 1952 F. KAHN 2,603,972
RELATIVE HUMIDITY METER
Filed Nov. 9, 1946 2 SHEETS—SHEET 2

INVENTOR.
Frank Kahn

Patented July 22, 1952

2,603,972

UNITED STATES PATENT OFFICE 2,603,972

RELATIVE HUMIDITY METER

Frank Kahn, Philadelphia, Pa.

Application November 9, 1946, Serial No. 709,025

5 Claims. (Cl. 73—338)

The present invention is a continuation-in-part of my patent application, Serial No. 454,009, filed August 7, 1942 now Patent No. 2,411,041 relating to relative humidity meters.

The invention relates to hygrometry, and, more particularly, relates to a direct-reading relative humidity meter.

The most convenient and most generally employed method for measuring accurately the degree of saturation of the atmosphere with moisture is to observe the temperature of evaporation—that is, the difference between the dry-air and wet-air temperatures. The dry-air or ambient temperature is read with the ordinary thermometer. The wet-air temperature may be accurately observed with the sling or whirled psychrometer, with the wet-air thermocouple described in Patent No. 2,128,462, dated August 30, 1938, issued jointly to Edward R. Wayne and myself, and relating to thermocouple hygrometers, and with my bimetal and thermistor wet-air temperature responsive units hereinafter described in detail. With the difference between the dry-air and wet-air temperatures determined, the relative humidity may be obtained from the Weather Bureau Psychrometric Tables, or the equivalent standard formula or chart.

This method of determining relative humidity, although of high accuracy, is inconvenient and because it is not direct reading is unsuited for recording or for control of humidity conditioning apparatus. On the other hand, reasonably priced direct-reading devices, which have heretofore been based upon relative tension of hygroscopic materials such as strands of hair, have been highly unreliable and have required much too frequent calibrations and adjustments to render their use practical where any degree of accuracy is required.

The increasing importance of air conditioning emphasizes the need for a simple, compact, inexpensive and permanently reliable device for measuring relative humidity directly. Apparatus for this purpose heretofore available has been extremely large and expensive, very inconvenient and laborious to operate, or highly unreliable.

The primary object of my invention is to provide a direct-reading relative humidity meter in which these defects are remedied.

An object of my invention is to produce a direct-reading relative humidity meter of high accuracy.

Another object of my invention is to provide a permanently reliable direct-reading relative humidity recorder.

A further object of my invention is to produce an inexpensive, simple, durable and reliable direct-reading humidity meter of good accuracy.

Another object of my invention is to provide a bimetal-powered direct-reading relative humidity meter.

A further object of my invention is to produce a direct-reading relative humidity meter in an electric circuit controlled by thermistors.

Still another object of my invention is to provide an automatic direct-reading relative humidity meter which is accurate, occupies a minimum of space, requires very little water and needs practically no attention or servicing.

With these and other objects in view, which will become apparent as the description proceeds, my invention is embodied in a relative humidity observing system which comprises essentially a wet-air temperature responsive unit in a stream of the air being measured, a dry-air temperature responsive unit in the same air, a meter having a movable element arranged in cooperative relation with both said wet- and dry-air units and adapted to be deflected proportionally to the difference in response of said units, and means responsive to the dry-air temperature of the air being measured to cause the indication of the meter to vary as a function of said dry-air temperature.

The invention, both as to details of construction and combination of parts, will best be understood from the following description of a specific embodiment which I illustrate as an example, when read in conjunction with the accompanying drawing, in which.

Figure 1:
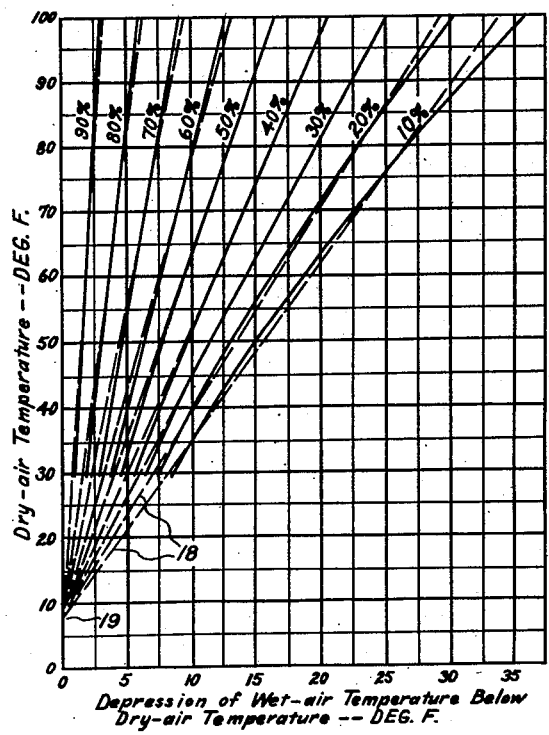
Fig. 1 is a diagram showing the relation of relative humidity to dry-air temperatures and to the differences between the dry-air and wet-air temperatures.

Referring now to the drawing, Fig. 1 is a graph in which the unbroken lines are curves of constant relative humidity, ordinates are dry-air or ambient temperatures, and abscissae are depressions of wet-air temperature below dry-air temperature. These data are plotted from the standard psychrometric tables in the United States Weather Bureau publication W. B. No. 235 for the standard evaporating conditions described therein.

Corresponding to the unbroken lines of constant relative humidity, I have shown an equal plurality of broken straight lines 18 diverging from a common point 19 on the axis of ordinates at about eight degrees Fahrenheit, one of said straight lines being drawn to coincide generally with each of the constant relative humidity curves between the ordinates 40° F. and 100° F. As is readily evident from Fig. 1, per cent. relative humidity can thus be represented with good fidelity by a series of straight lines on a graph of dry-air temperature as ordinates and depression of wet-air temperature as abscissae.

An indicating instrument having a deflecting element responsive to difference between wet-air and dry-air temperatures, when calibrated at a constant dry-air temperature in the range 40° F. to 100° F. in accordance with the intersections of the relative humidity lines 18 with the ordinate representing the dry-air temperature, will indicate with good accuracy per cent. relative humidity at that temperature. If the deflection of the element relative to the scale for a given wet-air to dry-air temperature differential be then made to vary inversely as the dry-air temperature less approximately 8° F., the instrument will indicate percentage relative humidity with good accuracy over the range of usual ambient temperatures as illustrated in Fig. 1. In other words, this effect is produced by merely making the sensitivity of indication of the meter inversely proportional to the dry-air temperature above approximately 8° F. I use the term "sensitivity of indication" to express the degree to which the deflection of the element relative to the scale is responsive to the difference between the wet-air and dry-air temperatures. As an illustration, referring to Fig. 1, the reading or indication for a dry-air temperature of 80° F. and a differential wet-air to dry-air temperature of 20° F. would be the same as for a dry-air temperature of 40° F. and a differential temperature of 9° F., namely 30% relative humidity. The instrument would thus have as great an indication relative to the scale for a 9° F. differential at 40° F. dry-air temperature as would result from a 20° F. differential at 80° F. dry-air temperature.

Figure 2:
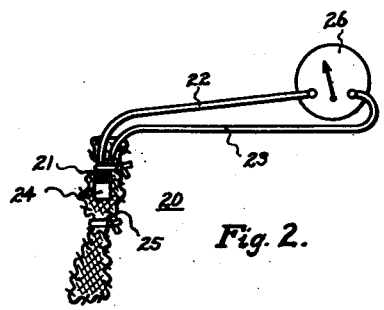
Fig. 2 is a diagrammatic representation of a thermocouple circuit differential unit powering the movable element of my meter.

Fig. 2 illustrates a thermoelectric circuit having an instrument responsive to the difference between wet-air and dry-air temperatures. A wet-air thermocouple unit 20 comprises a thermojunction 21 formed by union of two couple elements 22 and 23 secured with good thermal contact to a thermally conducting member 24, the whole being enclosed in an evaporative envelope 25. The thermocouple electric circuit is completed through a sensitive d'Arsonval-type ammeter 26, which forms the reference junction. When the air to be measured is forced past the wet-air unit 20 at the proper velocity with the wick 25 suitably moistened and with the ammeter 26 at the dry-air temperature, the net E. M. F. of the circuit, and therefore the current in the circuit, is substantially proportional to the depression of the wet-air temperature below the dry-air temperature.

Figure 3:
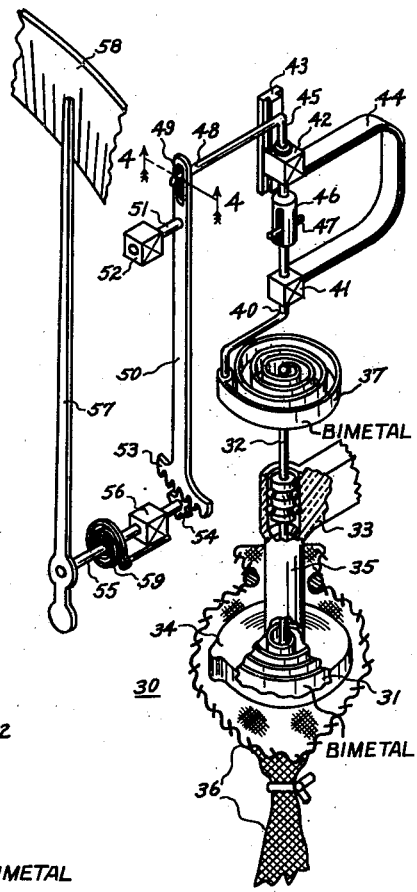
Fig. 3 is a fragmentary perspective view, partly in section, showing the movable element of my meter powered by a bimetal differential unit and having dry-air temperature responsive deflection sensitivity.

In place of the thermocouple differential unit of Fig. 2, the bimetal differential unit of the meter shown in Fig. 3 may be used. The wet-air unit 30 of this differential unit includes a bimetal spiral 31 having its internal end fixed to a concentric shaft 32 rotatably mounted in a ball thrust bearing 33. The external end of the spiral 31 is attached to an enveloping housing 34 of thin metal of good thermal conductivity such as silver or copper. The housing 34 is fixed to a cylindrical sleeve 35 integral with or secured to the stationary part of the bearing 33. The shaft 32 and the sleeve 35 are made of thermally non-conducting material such as synthetic resin or plastics. An evaporative envelope 36 completely encloses the housing 34 and a part of the sleeve 35, in such manner that heat leakage into the interior of said envelope via the sleeve 35 or shaft 32 is insignificant. The wet-air unit 30 comprises the envelope 36 and the mechanism enclosed therein. The housing 34 prevents the envelope 36 from interfering with the movement of the spiral 31 and also protects the bimetal from corrosion by moisture. The housing 34 is preferably filled with a light oil to minimize any lag in reaching steady-state temperature.

The shaft 32 extends beyond the bearing 33 and carries at the upper or outer end a dry-air bimetal spiral 37 similar to the spiral 31 and similarly attached to the shaft 32. A crank 40 journaled in a fixed bearing 41 aligned with shaft 32 has its offset end attached to the external end of the dry-air spiral 37. When the wet-air unit 30 and the spiral 37 are exposed to a current of the air to be measured at the proper velocity, the spiral 31 will soon reach the wet-air temperature and the spiral 37 the dry-air temperature. The shaft 40 will be rotated to a position corresponding to the differential rotation of the spirals 31 and 37, which is proportional to the difference between the wet- and dry-air temperatures or the abscissae of the graph of Fig. 1. In effect, this part of the device is a mechanical functional equivalent of the thermocouple circuit of Fig. 2.

One method of providing the desired variation of sensitivity of indication with change of ambient temperature is embodied in the device of Fig. 3 and will now be described. A bearing 42 is translatably mounted in a guide 43 for constrained movement in alignment with the shaft 32 as imposed by a U-shaped bimetal element 44 having its ends attached respectively to the bearings 41 and 42. A shaft 45 is journaled in bearing 42 which is of the thrust type to prevent axial movement of the shaft. The shaft 45 is provided with a slotted sleeve 46 at its lower end to receive the upper end of the crank shaft 40 which carries a transverse pin 47 engageable in the slot to prevent relative rotation of the two shafts 40 and 45 while permitting relative axial movement. The upper end of the shaft 45 is bent at right angles to form a lever 48 whose end engages a radial slot 49 in the upper end of a gear sector 50.

The sector 50 is fixed to a shaft 51 journaled in a fixed bearing 52, the shaft 51 being attached to the sector at a point between the slot 49 and the lower or gear end 53 so that the axis of rotation of the sector is relatively very close to the slot 49 as compared with the end 53. The gear 53 engages a pinion 54 fixed to a shaft 55 which extends through and is journaled in a bearing 56 and carries a pointer 57 operating over a fixed scale 58. A fine spiral spring 59 is attached to shaft 55 and bearing 56 to eliminate backlash.

Figure 4:
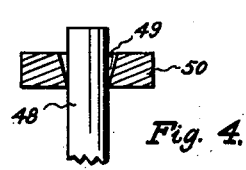
Fig. 4 is a fragmentary sectional view on the line 4—4 of Fig. 3.

This device functions as follows: The shaft 40 rotates proportionally to the difference between wet- and dry-air temperatures as previously explained. This rotation is communicated through shaft 45 to the sector 50, but the point of engagement of the lever 48 in the slot 49 is determined by the bimetal element 44. That is, the higher the ambient temperature, the higher the bearing 42 will ascend in its guide 43 and the less will be the rotation of the sector 50 and hence of the pointer 57. The object of the proportioning of the sector 50 to give a high mechanical advantage of the order of 10 to 1 or more is to provide a relatively great movement of the pointer 57 for a very small deflection of the lever 48 in the slot 49. Not only does this construction eliminate the need for excess clearances in the slot and lever connection as shown in Fig. 4, but the proportionality of angular movement is maintained at that connection because only very small angles are involved. In this device it is obvious that the shaft 40 could be operated from the rotating element of the ammeter 26 of the thermocouple circuit of Fig. 2 as well as from thte mechanical differential unit illustrated in Fig. 3.

Figure 5:
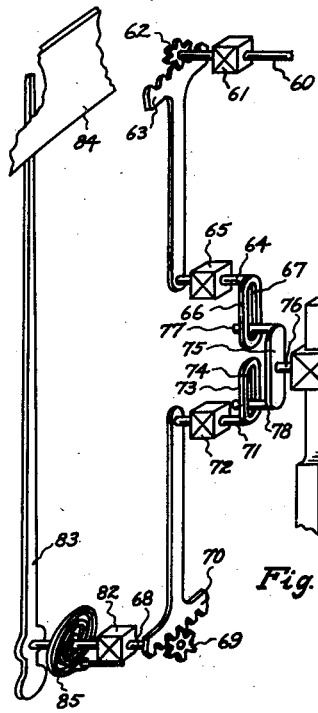
Figs. 5 and 6 show diagrammatic views of other modifications of bimetal control for dry-air temperature responsive deflection sensitivity for the movable element of my meter.

Fig. 5 shows another method of providing deflection sensitivity inversely proportional to the dry-air or ambient temperature. In this case the shaft 60 journaled in a fixed bearing 61 is operated from the bimetal differential unit of the device of Fig. 3 or from the ammeter moving element of the device of Fig. 2. The shaft 60 carries a pinion 62 which engages a gear sector 63 fixed to a shaft 64 journaled in a bearing 65. To the shaft 64 on the other side of the bearing 65 is fixed a lever 66 radially opposite the sector and provided with a radial slot 67. This mechanism from the pinion 62 to the lever 66 is duplicated by a similar system of identical parts, from a shaft 68 carrying a pinion 69 engaging a gear sector 70 on a shaft 71 journaled in a bearing 72 and having a lever 73 with slot 74. The rotational axes of the two systems are coplanar and parallel, with the pinions outermost and the two levers 66 and 73 rotatable in the same plane and adjacent to each other.

An element 75, fixed transversely to the end of a shaft 76, is provided with two outwardly projecting pins 77 and 78 equidistant from and parallel to the shaft 76. The shaft 76 is journaled in a bearing 79 arranged for translatory movement on a fixed guide 80 by means of a bimetal element 81 which is attached to said bearing 79 at one end and to the fixed guide 80 at the other. The position of the bearing 79 and guide 80 is such that the pins 77 and 78 engage the slots 67 and 74 at all times and the shaft 76 is axially coplanar and parallel to shafts 64 and 71. The shaft 68 passes through and is journaled in a bearing 82 and carries at its other end a pointer 83 operating over a fixed scale 84. A backlash eliminating spring 85 is provided between the shaft 68 and bearing 82.

The operation of this device is as follows: Rotational movement of the differential unit is communicated to the element 75 via the gear 62, sector 63, shaft 64, lever 66 and pin 77. The element 75 in turn communicates this movement to the pointer 83 via the pin 78, lever 73, shaft 71, sector 70 and pinion 69. The relative movements of levers 66 and 73 depend on the position in the slots 67 and 74 of the pins 77 and 78 as controlled by the bimetal element 81. The position illustrated is that corresponding to a low ambient temperature in which a small movement of the shaft 60 results in a considerable deflection of the pointer 83. As in the device of Fig. 3, this mechanism preserves good accuracy by adhering to the principle of reducing the angular deflection in sliding linkages, by making the sector radius very much longer than the associated lever arm.

Figure 6:
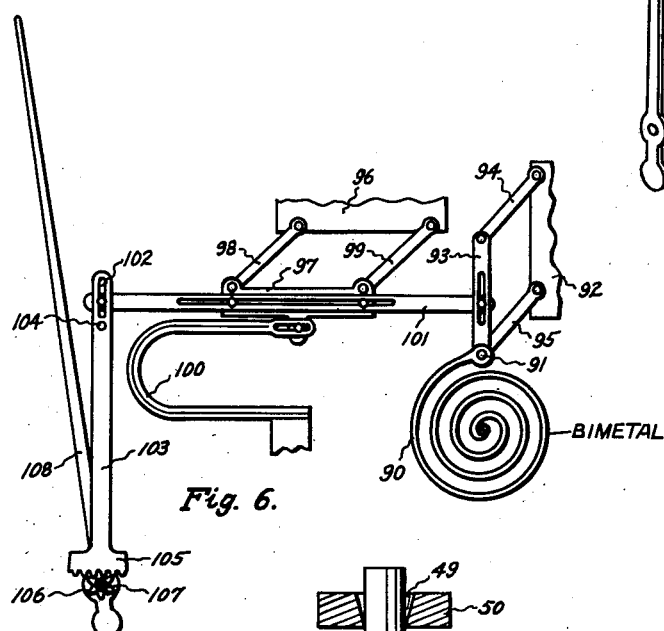

In Fig. 6 I have shown another modification for providing deflection sensitivity proportional to dry-air temperature. In this device the outer end of the dry-air bimetal spiral 90 is attached to the pivot 91 of a parallelogram four-bar linkage comprising a vertical fixed link 92, a parallel link 93 containing a longitudinal slot, and the connecting links 94 and 95. From the nature of this mechanism, the link 93 can move only parallel to itself. A similar second linkage comprising a horizontal fixed link 96, a parallel link member 97 and connecting links 98 and 99 constrain member 97 to movement parallel to itself under the control of a bimetal element 100 with one end fixed and the other end attached to member 97 by a slot and pin connection. A connecting member 101 is provided with a longitudinal slot which engages two horizontally aligned pins in the member 97, and a pin in one end which engages the slot in the link 93 whereby said member 101 is moved transversely to its length by the bimetal element 100 and in the direction of its length by the spiral 90. The other end of the member 101 carries a pin which engages a radial slot 102 in one end of a first class lever 103 pivoted at a point 104 and having a gear sector 105 at the other end engaging a pinion 106 on a shaft 107 operating a pointer 108. As in the similar mechanisms of the devices previously described, the sector end of the lever 103 is many times longer than the slotted end to minimize angularity errors. In the position shown, which represents 100% relative humidity (identical wet- and dry-air temperatures) it is readily seen that movement of the ambient temperature bimetal element 100 which controls deflection sensitivity will merely move the member 101 vertically without affecting the pointer position.

Figure 7:
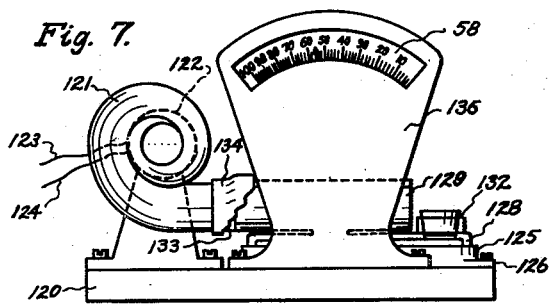
Fig. 7 is a front elevation of a self-contained direct-reading relative humidity meter embodying the device of Fig. 3.
Figure 8:
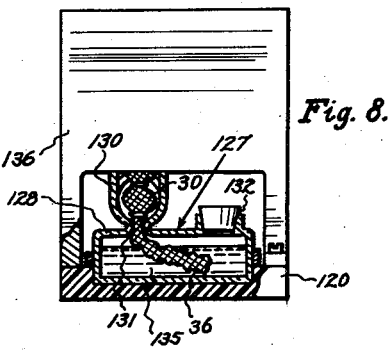
Fig. 8 is a side elevation, partly in section, of the meter shown in Fig. 7.

The device of Fig. 3, as embodied in a small self-contained compact portable relative humidity indicator, is illustrated in Figs. 7 and 8. A base 120 has attached thereto a miniature centrifugal blower 121 driven by an electric motor 122 which is supplied with electricity via leads 123 and 124 from a suitable source of electric energy (not illustrated) which may be A.-C. or D.-C. A collar bracket 125 is provided with an outward flange 126 which is attached by screws to the base 120. A container 127 having an oval lower reservoir section 128, a duct section 129 and a mouth section 130, is held in place by the bracket 125 which fits about the reservoir 128. The duct 129 communicates with the reservoir 128 by way of a relatively small opening 131 directly below the mouth section 130. A housing 136, which encloses a device of the type illustrated in Fig. 3 exposing only the dependent wet-air unit 30, is also mounted on the base 120 in such relation to the container 127 that the wet-air unit 30 fits into the mouth section 130. The bottom part of the wick 36 is then inserted into the reservoir 128 through the opening 131 which is purposely a tight fit to minimize the rate at which water is evaporated from the reservoir. A stoppered fill opening 132 is provided to replenish the water supply. The exhaust vent 133 of the fan 121 abuts the inlet end of the duct 129 and the joint is made airtight with an elastic sleeve 134 which fits over both parts.

The operation of this meter is as follows: The reservoir 128 is filled with water 135 through the opening 132. Electric energy is then supplied to the motor 122 causing the fan 121 to force a stream of air through the duct 129 over the unit 30. In a few seconds the temperature of the unit 30 will be reduced to the wet-air temperature and the pointer will indicate per cent. relative humidity on the scale 58 in accordance with the broken lines of the graph of Fig. 1, as previously explained.

The illustrations of Figs. 7 and 8 depict the container 127 as made of glass but it may be made of any other suitable material such as metal or a resin. The meter is designed for both continuous operation and for spot readings. In the latter case the fan is started and the indicating pointer of the meter is observed until it reaches a minimum value of relative humidity, the steady state condition being reached in a very short time because of the small size of the wet-air unit.

Figure 9:
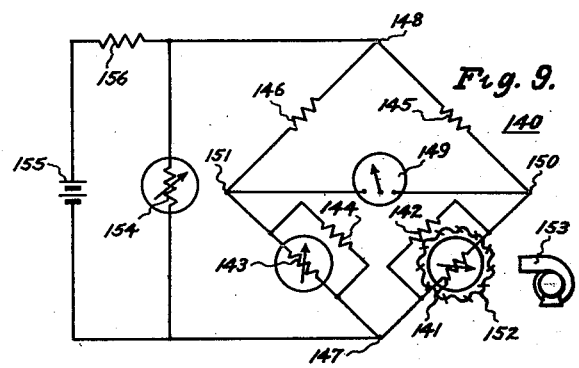
Fig. 9 is a diagrammatic representation of an electric circuit utilizing thermistors for direct indication of relative humidity.

Fig. 9 shows an electric circuit for obtaining direct readings of relative humidity, in which thermistors are utilized to provide indicating instrument deflection proportional to differential temperature and to provide the desired sensitivity of indication response to dry-air temperature. Thermistors, or thermally sensitive resistors, are solid electronic semiconductors with high negative temperature coefficients of resistance, such as $Mn_2O_3$, $Fe_2O_3$ and $NiO$ or combinations thereof. The theory of operation and characteristics of such thermistors are well described in an article entitled "Properties and Uses of Thermistors—Thermally Sensitive Resistors," by J. A. Becker, C. B. Green and G. L. Pearson published in A. I. E. E. Transactions, volume 65, 1946, November Section, pages 711–25. Thermistors of type similar to the thermistor whose temperature versus resistance characteristic is set forth in Table II, page 719 of the aforesaid article, are suitable for use in the device of Fig. 9. Although these thermistors may be practically of any desired shape, I prefer to use disk thermistors made from compressed and sintered powdered semiconductor materials of the desired characteristics with metal powder contacts fired on.

The bridge circuit 140 produces the response to differential temperature and comprises a wet-air responsive thermistor 141 shunted by a resistor 142 in one arm, an identical dry-air thermistor 143 shunted by a resistor 144 in the opposing arm, and two identical resistors 145 and 146 in the other two arms, the resistors 145 and 146 being in series with the arms including thermistors 141 and 143, respectively. Voltage is supplied to the bridge between the junction 147 of thermistors 141 and 143 and the junction 148 of resistors 145 and 146. A current responsive indicating or recording meter 149 is connected between the junction 150 of thermistor 141 and resistor 145 and the junction 151 of thermistor 143 and resistor 146. The wet-air thermistor 141 is enclosed in a moist wick 152 and supplied with an air stream from the blower 153. At constant voltage applied to the bridge, it is evident that meter 149 will be deflected responsive to the difference in resistance of the arms containing thermistors 141 and 143, and therefore responsive to the differential temperature. The resistors 142, 144, 145 and 146 are proportioned to the characteristics of the thermistors 141 and 143 to produce the desired response characteristic.

The connections 147 and 148 of the bridge 140, which are shunted by an ambient temperature thermistor 154, are connected to a battery 155 in series with a resistor 156. As the ambient temperature increases, the resistance of the thermistor 154 will decrease causing increased flow of current through the resistor 156 and increased voltage drop between its terminals. The voltage across the thermistor 154 and the bridge 140 in parallel therewith will be correspondingly decreased. The voltage to the bridge 140, and thereby the response of the meter 149, will thus vary in inverse relation to the ambient temperature. The resistor 156 is suitably proportioned to the characteristics of the thermistor 154 and the bridge 140 to give the desired dry-air responsive deflection sensitivity. It is evident that the bridge circuit of Fig. 9 will function equally as well when supplied with alternating current in place of the battery.

Figure 10:
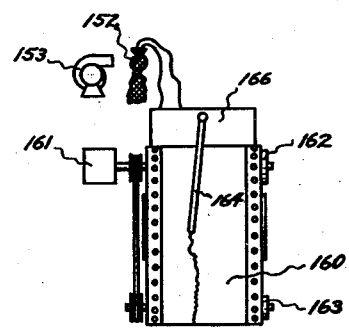
Fig. 10 is a diagram of a strip chart recorder for use with my relative humidity meter.

As illustrated in Fig. 10, the device of Fig. 9 can be used to record relative humidity continuously on a strip chart 160. The chart 160 is driven by a motor 161 operating a driving roller 162 and reroll 163. A suitably arranged marking pointer 164 is actuated by a meter 166 equivalent to the meter 149.

Figure 11:
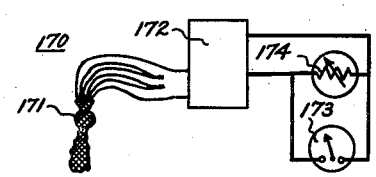
Fig. 11 is a diagrammatic representation of a direct-reading relative humidity meter including a thermocouple circuit differential unit with an electronic voltmeter and utilizing a thermistor to obtain dry-air temperature responsive deflection sensitivity.

In Fig. 11 I have shown a thermocouple circuit differential unit 170 with a wet-air unit 171 similar to the unit 20 of Fig. 2 but having in place of the single junction 21 a thermopile to increase the voltage output, as described in my aforesaid copending patent application, Serial No. 454,009 now Patent No. 2,411,041. The measuring junction of the thermopile wet-air unit 171 supplies the input to a highly sensitive D.-C. electronic back-out voltmeter 172.

An indicating meter 173 in parallel with a thermistor 174 is connected to the output terminals of the voltmeter 172. The portion of the output current passing through the thermistor 174 increases with increase in ambient temperature thereby reducing the indication of the meter 173 and providing the desired temperature responsive change in sensitivity.

Although the compact self-contained relative humidity meter shown in Figs. 7 and 8 is illustrated as having a bimetal powered differential unit as in Fig. 3, it is obvious that the devices of Figs. 9 and 11 may be used instead to provide the indication. Also, the recorder of Fig. 10 may be controlled from the devices shown in Figs. 3, 5, 6 and 11 instead of the thermistor bridge circuit of Fig. 9, as illustrated.

Although the invention has been described in considerable detail, such description is intended as illustrative rather than limiting, as other embodiments will be evident to those skilled in the art, as well as obvious modifications in construction and arrangement without departing from the spirit of the invention.

I claim:

1. In a direct reading relative humidity meter, a deflecting element, a scale, a pointer adjacent to said scale and adapted to be positioned with relation thereto by said element, means for deflecting said element and said pointer proportionally to the difference between the wet-air and dry-air temperatures of the air to be measured, and ratio control means independently responsive to dry-air temperature interposed between said element and said pointer for automatically controlling the relation between the deflections of said element and said pointer as a function of dry-air temperature, said first-mentioned means being powered by two bimetal members cooperatively connected to each other and to said element to deflect said element proportionally to their differential response, one of said members being provided with an evaporative envelope and adapted to be subjected to standard evaporating conditions.

2. In a direct reading relative humidity meter, a deflecting element, a scale, a pointer adjacent to said scale and adapted to be positioned with relation thereto by said element, means for deflecting said element and said pointer proportionally to the difference between the wet-air and dry-air temperatures of the air to be measured, and ratio control means independently responsive to dry-air temperature interposed between said element and said pointer for automatically controlling the relation between the deflections of said element and said pointer as a function of dry-air temperature, said first-mentioned means being powered by two bimetal members cooperatively connected to each other and to said element to deflect said element proportionally to their differential response, one of said members being provided with an evaporating envelope.

3. The invention set forth in claim 2 characterized in that for a given deflection of said element said ratio control means varies the ratio of deflection of said pointer to deflection of said element in inverse proportion to approximately 8° F. less than the dry-air temperature of the air to be measured.

4. The invention set forth in claim 2 characterized in that said pointer includes a lever member having one arm variable in effective length and that said ratio control means is adapted to vary the effective length of said lever arm.

5. The invention set forth in claim 2 characterized in that said meter includes means for directing a current of the air to be measured against said evaporative envelope, and reservoir means for supplying moisture to said evaporative envelope.

FRANK KAHN.

REFERENCES CITED

The following references are of record in the file of this patent:

UNITED STATES PATENTS

| Number | Name | Date |
|---|---|---|
| 1,453,688 | Milker | May 1, 1923 |
| 1,855,774 | Schneider | Apr. 26, 1932 |
| 1,946,702 | Lanquetin | Feb. 13, 1934 |
| 1,986,316 | Beals | Jan. 1, 1935 |
| 2,106,083 | Chappell et al. | Jan. 18, 1938 |
| 2,177,630 | Alder | Oct. 31, 1939 |
| 2,215,218 | Harrison | Sept. 17, 1940 |
| 2,265,767 | Alder | Dec. 9, 1941 |
| 2,294,540 | Edwards | Sept. 1, 1942 |
| 2,343,878 | Allen et al. | Mar. 14, 1944 |